Patented Aug. 2, 1932

1,869,721

UNITED STATES PATENT OFFICE

BARNETT SURE, OF FAYETTEVILLE, ARKANSAS

EXTRACTION AND CONCENTRATION OF VITAMINS

No Drawing. Application filed January 15, 1930. Serial No. 421,074.

The present invention relates to vitamins, having particular reference to a process of extracting certain vitamins from materials containing them.

Vitamins are substances only recently recognized as vital dietary components in nutrition. They occur in natural food products to a large extent, but little is known of the nature of them. A number of specifically different vitamins are referred to in various studies on them, and they are named and classified by letters, such vitamin A, vitamin B, etc. The chemical composition of vitamins is not known, but certain properties of them have been determined, and they are classified to some extent by their properties, such as fat-soluble vitamins, and water-soluble vitamins. It is now recognized that such diseases as beriberi, rickets and pellagra are caused by a marked deficiency of vitamins B, D and G, respectively. Many nutritional disturbances, characterized by lack of appetite, underweight, susceptibility to colds, etc., have been demonstrated to result from inadequite supplies rather than from total deficiency of vitamins. They are not all stable substances, and it is known that some of them are destroyed by certain chemicals, or by other conditions, such as heating. Cooking of certain foods in ordinary usage is known to lessen or totally destroy some vitamins of the uncooked food.

Vitamins were first recognized in natural foodstuffs and other materials of natural origin, both vegetable and animal. The embryos of cereals; leafy vegetables, such as spinach and lettuce; egg yolk; and glandular organs, such as liver and kidney are rich sources of vitamins found in natural foods. More recent work has demonstrated that cereals and other materials may be exposed to ultra-violet light and other radiations with the resulting production of a substance having the properties of a vitamin.

The present invention relates to a process which is specially adapted for the extraction of vitamin B from materials containing it. The process may be carried out in such a way that it is also specially adapted for extracting vitamin G from materials containing that vitamin, and the process is therefore capable of extracting both vitamin B and vitamin G from materials containing both. The invention is, of course, not limited to use of the process for natural products, for it is equally well adapted to use with irradiated products or extracts which contain these vitamins as a product of irradiation, or to other products in which the presence of such vitamins may be artificially induced.

Cod liver oil is one source of vitamins A and D. Oranges are one source of vitamin C. Rice polishings, wheat embryo, yeast, etc., are among the sources of vitamin B and also of vitamin G, both of which are considered in this process. Vitamins B and G are both water-soluble vitamins, B being less stable towards heat and in the presence of alkalis, and G being more stable towards heat. These particular vitamins are important in infant and child nutrition, and in combating diseases due to malnutrition. Both breast milk and cow's milk have been shown to be deficient in vitamin B. Pediatricians are beginning to appreciate the need of supplementing the infant's diet with vitamin B extracts. Although yeast is available as a source of vitamin B it is contra-indicated for infants because of the attendant materials which produce fermentation in the gastro-intestinal tract of infants. Wheat embryo extracts may be employed but are considered too laxative for infants, although not undesirable for adults. There is, therefore, a field for the provision of a vitamin extract which can be added to an infant's diet without interference from materials other than the vitamin.

The invention aims to provide a suitable prophylactic and therapeutic vitamin extract which can be used for infants, which is not distasteful and unpleasant of odor, which can be added to a diet of both infants, children and adults without interference from other materials contained in the extract.

A particular object of the invention is the preparation of such an extract, which may also contain vitamin G.

Another object of the invention is the preparation of an extract of vitamin B from rice polishings, a substance which has long been used as a source of nutritious substance in infantile beriberi without harmful effect on infants. Rice polishings is a byproduct of the milling of rice, which is removed after the hulls and bran have been removed. It is the byproduct richest in vitamin B.

A further object of the invention is to concentrate the vitamin content from materials containing it, and to provide a staple product for commerce.

A further object of the invention is the preparation of a highly potent vitamin extract, and one which is relatively free from impurities such as nitrogenous matter.

Owing to the still general ignorance of the nature of vitamins and to the little known properties of these substances, it is quite impossible to point out definitely the entire limits of the invention in the manner which can be done in the more exact sciences. In this application, however, I am able to survey the path generally to be followed in preparing the extract and can give as an illustrative example of the invention specific directions of one course to follow to get the result desired. It is to be understood that the invention is not to be considered as limited to the precise disclosure that is herein made by way of illustrating the invention in order to explain it. There may be variations from the prescribed course as will naturally occur to those who are skilled in the art. Such deviations and changes will again be referred to later in the description when they will be more clearly understood.

I wish first to illustrate the invention by describing how the same may be practiced on rice polishings.

Generally the process involves extraction of the vitamin with a solvent from the base material, separation of the solvent containing the vitamin from the undissolved substance, and then removal of the solvent to leave the extracted matter as a residue. This residue is the crude extract containing other materials besides the vitamin, such as bad tasting or smelling substances which make the crude extract undesirable. The process then involves a purification by which undesirable impurities are eliminated and a useful extract or concentrate obtained.

As solvent for treating the base material I prefer to use an essentially water solvent, such as a dilute ethyl alcohol solution, I have found that a solvent which is 25% ethyl alcohol by volume and 75% water is suitable. It will, of course, be understood that other solvents may be used. A suitable solvent is one which can be readily removed by suitable means from the contained extract without damage to the extract in the removal process. The vitamins with which I am concerned are essentially water soluble and dissolve in the mixed alcohol and water as well as in water, provided a sufficient quantity is used. The alcohol aids in preventing a fermentation which might otherwise occur if water, or acidified water were used for the extraction. In using alcohol and water as described I have found that there is a tendency to destroy the vitamin B when the solvent is distilled, even at low temperaturts in a vacuum, and have found that the presence of an acid in the distillation preserves the vitamin. Consequently, I use some acid in the distillation to preserve vitamin B.

I have found that acid may be used in the extraction solvent without injuring the extraction of vitamin B. Acid tends to stabilize the vitamin B. Accordingly, when vitamin B is concerned I may add the acid either before extraction with the solvent, or before distillation of the solvent. But when I use the acid during the extraction I find there is an increase in the amount of vitamin G that may be extracted at the same time, if it is present. Therefore, when I am concerned with vitamin G alone, or both vitamins B and G, I use an acid extracting solvent.

Slight acidity is all that is required, and various acids may be used, such as acetic, hydrochloric, citric, etc. I prefer to employ any acid which may be later used in the process, and in the specific example will describe acetic acid. This acid is ordinarily considered harmless in small amounts, being the acid of vinegar having a recognized place in the diet.

As a specific example of the extraction of vitamins B and G from materials containing both of them, one may take 3600 grams of rice polishings and 20 liters of alcohol which is 25% by volume (with water) and which contains 0.5% acetic acid, or such an amount as will maintain acidity during the step to follow when the solvent is removed from the extract. The polishings and the solvent are allowed to stand with continual or intermittent agitation for about forty-eight hours at the temperature of the average living room. At the end of this period, or such shorter period as may be chosen, the polishings are allowed to settle and the liquid is decanted from the settled matter. Undissolved vitamin and that which adheres to the settlings in the solvent remaining is then removed by a washing or extraction process with a further amount of an extracting solvent. I have allowed the settlings to be again extracted with 10 liters of the same solvent in twenty-four hours with intermittent agitation. The solvent is then decanted, and the combined liquids are filtered from solid matter for recovery therefrom of a crude extract.

The combined liquids are treated to separate the solvent and the solute, as by distillation, at a temperature, and otherwise under conditions, which do not destroy the vitamin content. I have found that the alcohol and water may be distilled off at lowered pressures without destroying the vitamin. I may use a vacuum of 50 mm. to 75 mm. pressure of mercury and a temperature of from 50° C. to 60° C. This is continued until a viscous residue is formed. The distillation may be stopped where the residue has a specific gravity of from 1.42 to 1.47.

The crude extract obtained by the above described procedure is a dark brown, gummy mass which is both acid and bitter in taste. This crude mass is an acid extract or concentrate of vitamins B and G. There will be obtained from the initial quantity of rice polishings, about 720 grams of crude extract, or about 20% yield. The extract may, of course, be used, but its taste and its impurities mitigate against desirability of using the same.

I next provide a step of purification to remove the outstanding impurities from the vitamins. Bitterness and acidity are important to remove. Color also may be lessened in the treatment which is employed. The method in general is to dissolve or suspend the whole mass in a solvent therefor, and then to dilute the mass with a diluent which forms a mixed solvent in which one or more of the impurities is insoluble and in which the vitamin content desired is soluble. By this procedure the impurities may be removed mechanically after their precipitation in and by the mixed solvent.

To the crude extract I add a solvent compatible with the next solvent to be used as a diluent. To 100 grams of crude extract I add 500 cc. of glacial acetic acid. I prefer the acid which is used in the extraction to be the same as the acid used here in purification, when such is used, for the reason that but one acid then becomes associated with the product. The suspension is accomplished at room temperature and complete mixture is made so that all the vitamin content is subjected to action of the solvent. As a precipitant, I use anhydrous acetone. This may be produced by extracting the water from a water-containing acetone in any known manner, such for example as by treatment with anhydrous sodium sulphate crystals. I use 3600 cc. of the acetone, adding it gradually with stirring to the glacial acetic acid solution of the extract. A granular precipitate occurs and rapidly settles to the bottom of the vessel. It may be separated in as soon as five minutes. The granular precipitate occurs and rapidly settles to the bottom of the vessel. It may be separated from the solution and then washed with 3600 cc. of the same character of acetone in order to remove adherent or included vitamin which can be dissolved in the acetone. The two acetone portions, one containing substantially all the acetic acid, are combined and treated for the separation of vitamin extract therefrom.

The separation of the vitamin from the solvent may be effected by a distillation under conditions which do not injure the vitamin. A low temperature distillation is suitable and may be conducted as follows: The solvent and contents are distilled in vacuo, first to remove acetone portions, and later to remove acetic acid portions. The acetone, having a considerably lower boiling point than acetic acid, may be distilled off under a vacuum of 200 mm. to 250 mm. of mercury pressure at a temperature of from 30° C. to 40° C. Two and one-half to three hours may be consumed in this operation without destroying the vitamin content. Next, the vacuum is increased and the temperature raised to remove acetic acid. This may be done at a temperature of from 40° C. to 70° C. at a mercury pressure of from 50 mm. to 75 mm. Three hours may be consumed in this operation without destroying the vitamin content. The residue is a viscous product and may contain from 10 per cent to 15 per cent acetic acid which is best not removed in the distillation. To push the distillation too hard might destroy the vitamin content. Acid exerts a preservative influence on the material, and the residue strongly holds the acid to itself.

By the above treatment the bitter taste and other impurities have been removed, but it will be noted that there is still acid remaining as an impurity. This may be reduced in part by addition of suitable alkali to neutralize the acid. But I prefer to remove it by a further evaporation treatment. To the residue remaining from the 100 grams of crude extract I add 100 cc. of distilled water, which readily dissolves the mass. The resulting liquid is then spread out in a thin film, say 2 mm. deep, and allowed to evaporate at normal temperatures of the room and at normal pressures. Thus the acid is dissipated along with the water with which it has been diluted, with the aid of a current of air, or otherwise. A residue of about 36 to 40 grams is obtained which is an amber-colored viscous liquid. It may have from 1.5 per cent to 2 per cent acidity but this is an aid in preserving the material as a more stable product. It is very potent in antineuritic, growth-promoting antiberiberi vitamin B, and contains appreciable amounts of the stable antipellagric vitamin G.

In as for as a chemical analysis may indicate the nature of the product above described, the final product may be said to contain, by a showing of analysis, the following constituents:

| | Per cent |
|---|---|
| Moisture | 32.0 |
| Acetic acid | 1.8 |
| Reducing sugars as invert sugar | 42.6 |
| Ash | 5.7 |
| Fat (ether extracted) | 0.3 |
| Total nitrogen | 1.1 |

The residual acidity is sufficient at least to keep the product stable in a refrigerator for three months. This is not unsuitable for commercial usage. I do not contemplate that the acetic acid be the only preservative for the product. Merely because it is present as a beneficial incident to its manufacture, I may follow the known practices of the art in preserving foods and such nutritional extracts. I may use as a mild preservative one-tenth of one per cent benzoate of soda. This has been effectively used for years in preserving the extracts heretofore known in the Philippines and made from rice polishings.

The low nitrogen in the product may prevent or minimize a skin rash, produced by some high nitrogen products in infant's diet.

The potency of the product may, of course, vary under varying conditions of operation and of modifications of the procedure above specifically outlined. In using rice polishings and the materials and proportions herein given I have obtained a very potent product.

My extract was found to be five hundred (500) times as potent as cow's milk in vitamin B and one hundred fifty (150) times as potent as cow's milk in vitamin G. One teaspoonful of my product contains as much vitamin B as is found in 5 to 5.5 quarts of cow's milk.

A vitamin extract made by my invention may be used either as a concentrate, or it can be impregnated in various infant foods, such as dextro-maltose, lactic acid milk, various dried milks approximating the composition of breast milk, or any other kinds of foods. It is also understood that my vitamin product may be used for growing children, and adults, in cases of malnutrition, lack of appetite, and in diseases associated with loss of appetite, such as tuberculosis and pernicious anemia. I may mention in particular that the vitamin extract which I obtain from rice polishings contains a considerable amount of vitamin G along with vitamin B, and such a double extract or concentrate is beneficial in the early months of artificial feeding when the dilutions of milk are great.

It will be readily understood by those who are skilled in the art that a change in the raw material used as a source for the vitamin or vitamins may call for changes in the chemical reagents and the proportions, and conditions of operation. Also a change in the quantity of material treated in one operation, and a change of equipment used from the small scale to large scale work, will lead to economies in materials and in time, such as cannot be readily introduced nor here described for smaller batches. The character of the acid and the degree of acidity in the extraction are subject to variation. The strength of the extracting solvent may be changed, as there is nothing to indicate that it is limited to exactly 25 per cent of alcohol by volume with water. The consistency of the crude extract which is obtained may likewise be varied. In the same manner there may be changes in the quantities of solvent and precipitant used for the purification process, and the conditions under which these materials are distilled so long as the precautions against injury or destruction of the vitamin are observed. My viscous vitamin product may be dehydrated by the Spray or Roller processes, during which operations residual acidity may be dissipated. It is now known that liquids may be very rapidly evaporated at temperatures which in ordinary distillation would destroy certain products, by spraying a mist of the liquid into chambers that are heated with air currents in a vacuum. The material in such processes is so quickly passed through the heat that there is little or no change effected, comparable to that which takes place at the same temperature under longer exposure. By use of these methods a powdered product may be produced, comparable to dried milk powders, dried blood, etc., and different conditions maintained which depart from those here set forth.

Owing to the still incomplete knowledge about vitamins and their reactions, such changes in my process must be effected with caution. Gradual departure from the specified conditions of the exemplary process may, of course, be made, the effect of which may be readily determined by measuring the potency of the product resulting from this process with such variations.

Although I have illustrated my invention by describing my process specifically as I have carried it out to extract both vitamin B and G from rice polishings, it will be understood that the invention is capable of application to extract similar vitamins from other substances such as wheat embryo for example.

I do not intend the invention to be limited to the precise disclosure but aim to include such modifications and changes, and such equivalent materials as fall within the scope of the appended claims defining the invention.

The present application is a continuation in part for my former application, Serial No. 354,175, filed April 10th, 1929.

I claim:

1. The method of purifying a crude extract of vitamin B which comprises subjecting the crude extract to the solvent action of glacial acetic acid, diluting the mass with anhydrous acetone in quantity to form a mixed solvent in which the vitamin is soluble and in which an impurity is insoluble, separating the impurity from the mixed solvent, and distilling the mixed solvent from the solute at a reduced pressure under substantially 70° C.

2. The method of purifying a crude extract of vitamins B and G which comprises subjecting the crude extract to the solvent action of glacial acetic acid, diluting the mass with anhydrous acetone in the proportion of about 36 parts of the acetone to about 5 parts of the glacial acetic acid, separating solid matter from the resulting mass, and from the resulting liquid distilling acetone and acetic acid at a reduced pressure and at a temperature not over substantially 70° C.

3. The method of concentrating vitamin B from material containing the same which comprises subjecting the material to extraction by an alcoholic water mixture, separating solids from liquid, distilling alcohol and water from the liquid in the presence of an acid under reduced pressure at a temperature not over substantially 70° C., suspending the residue in glacial acetic acid to dissolve the vitamin content, adding to the resulting mass a quantity of acetone until a soluble impurity is rendered insoluble in the resulting mixed solvent, separating the impurity from the liquid, and distilling acetic acid and acetone from the liquid at a reduced pressure at a temperature under substantially 70° C., whereby to form a purified extract.

4. The method of concentrating vitamins B and G from rice polishings which comprises subjecting the material to the solvent action of a mixture of substantially 25% by volume of alcohol with water and containing about .5% of acetic acid, separating solid and liquid, distilling alcohol and water from the liquid under reduced pressure at a temperature under substantially 70° C., adding glacial acetic acid to the residue to dissolve the vitamin content thereof, diluting the mass with anhydrous acetone to form a mixed solvent in which the vitamin is soluble and in which an impurity is insoluble, separating the insoluble impurity from the liquid, distilling the liquid to remove acetic acid and acetone under reduced pressure at a temperature not over substantially 70° C., whereby to form an acidified residue containing the vitamins, adding water to the residue, and simultaneously volatilizing water and acid from the mass, whereby to form a stable slightly acidified vitamin extract.

In testimony whereof, I affix my signature.

BARNETT SURE.